US006558444B1

(12) United States Patent
Hunter

(10) Patent No.: US 6,558,444 B1
(45) Date of Patent: May 6, 2003

(54) FLUID FILTERS HAVING A CONCEALED MACHINE-READABLE IDENTIFICATION

(75) Inventor: Susanne Phyllis Hunter, Richmond (GB)

(73) Assignee: PSI Global Ltd., Durham (GB)

( * ) Notice: Subject to any disclaimer, the term of this patent is extended or adjusted under 35 U.S.C. 154(b) by 0 days.

(21) Appl. No.: 09/857,301

(22) PCT Filed: Dec. 3, 1999

(86) PCT No.: PCT/GB99/04017

§ 371 (c)(1),
(2), (4) Date: Jun. 1, 2001

(87) PCT Pub. No.: WO00/32298

PCT Pub. Date: Jun. 8, 2000

(30) Foreign Application Priority Data

Dec. 3, 1998 (GB) ................................. 9826671

(51) Int. Cl.$^7$ ........................ B01D 46/42; B01D 35/14
(52) U.S. Cl. ...................... 55/385.1; 96/417; 96/421; 55/467; 55/DIG. 34; 95/19; 95/25
(58) Field of Search ................... 96/417, 421, 423, 96/424; 95/19, 25, 26, 273; 55/385.1, DIG. 34, 467

(56) References Cited

U.S. PATENT DOCUMENTS

| | | | |
|---|---|---|---|
| 3,841,484 A | | 10/1974 | Domnick |
| 5,192,424 A | * | 3/1993 | Beyne et al. ................. 55/378 |
| 5,606,311 A | * | 2/1997 | Polidan et al. ................. 96/421 |
| 5,674,381 A | * | 10/1997 | Den Dekker ................. 96/417 |
| 5,676,196 A | * | 10/1997 | Jakubzick et al. ............. 96/418 |
| 5,766,282 A | | 6/1998 | Bin |
| 6,040,777 A | * | 3/2000 | Ammann et al. ............... 95/25 |
| 6,073,302 A | * | 6/2000 | Buscher ........................ 96/418 |
| 6,179,903 B1 | * | 1/2001 | Muller ......................... 96/417 |
| 6,203,590 B1 | * | 3/2001 | Byrd et al. .................... 96/424 |
| 6,391,102 B1 | * | 5/2002 | Bodden et al. ................. 95/19 |

FOREIGN PATENT DOCUMENTS

| | | |
|---|---|---|
| DE | 19601651 | 7/1997 |
| EP | 0720863 | 7/1996 |
| JP | 4284807 | 10/1992 |
| WO | 9422551 | 10/1994 |
| WO | 9841306 | 9/1998 |

OTHER PUBLICATIONS

English language abstract of JP 4284807.
English language abstract of DE 19601651.

* cited by examiner

*Primary Examiner*—Duane Smith
*Assistant Examiner*—Jason M. Greene
(74) *Attorney, Agent, or Firm*—Baker Botts L.L.P.

(57) ABSTRACT

An intake filter (1) or a coalescing filter (4) of a compressor or vacuum pump, or an in-line filter has its identity recorded in a transponder (50, 54), memory chip or other device such as a magnetic or magnetostrictive strip. Interrogation e.g. by means of antennae (52, 56) enables a control unit (55) to verify the identity of the filter and to store the result in memory (57). A record can therefore be maintained of whether approved filters are being used and whether they are exchanged at approved intervals.

3 Claims, 6 Drawing Sheets

B - POOR INTAKE
  - POOR OIL
  - VAPOUR MOVING THROUGH INTAKE

FLUID FILTERS HAVING A CONCEALED MACHINE-READABLE IDENTIFICATION

CROSS-REFERENCE TO RELATED APPLICATIONS

This application is a national phase application of International Application No. PCT/GB99/04017, which was filed on Dec. 3, 1999 and which published in English on Jun. 8, 2000, which in turn claims priority from Patent Application No. GB 98 26671.1, which was filed on Dec. 3, 1998.

FIELD OF THE INVENTION

The present invention concerns a replaceable filter element or cartridge and in particular, though not exclusively, to such an element or cartridge for the filtration and purification of air. The invention also relates to an active device forming part of a pneumatic or vacuum system protected by such a filter. Such active devices include compressors, vacuum pumps, valves and the like.

BRIEF SUMMARY OF THE INVENTION

Broadly stated, the invention provides a fluid filter having a concealed tamper-proof machine-readable identification.

The invention further provides filtration apparatus comprising a fluid filter as aforesaid and a filter head or housing having means for reading or otherwise detecting the identification.

The invention further provides a device or system in which a filter is present for conditioning a flow of gas or liquid to assure the correct functioning of the device or system, in which the filter is required to be replaced periodically, and in which the filter has a machine readable identity which the device or system can read to verify whether a correct filter is in place.

The invention may be provided by an active device having its own power source. However, it is preferred that it should be provided by a passive or un-powered device such as a resonator, memory device or transsponder that can be interrogated by signals from a reader which may be directly connected thereto or may be magnetically or electrostatically coupled thereto.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
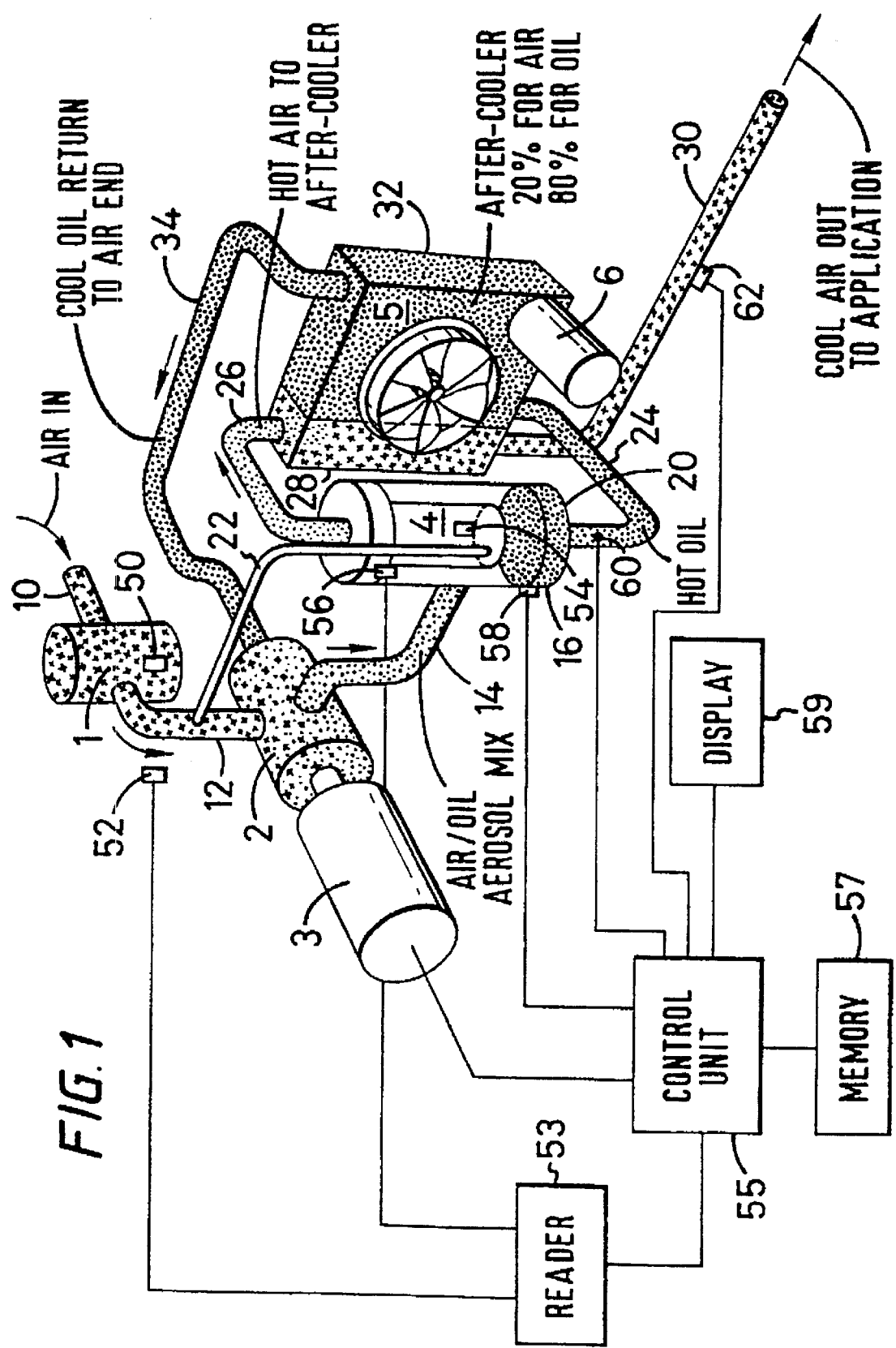
FIG. 1 is a diagram of a compressor.
Figure 2:
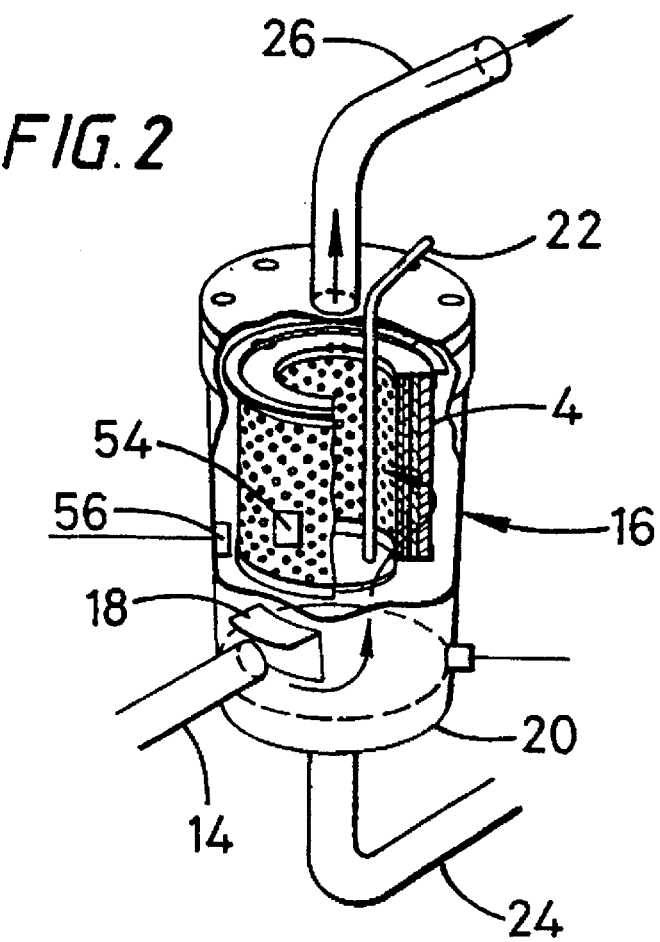
FIG. 2 is a diagram of an air separation and sump unit forming part of the compressor.
Figure 3:
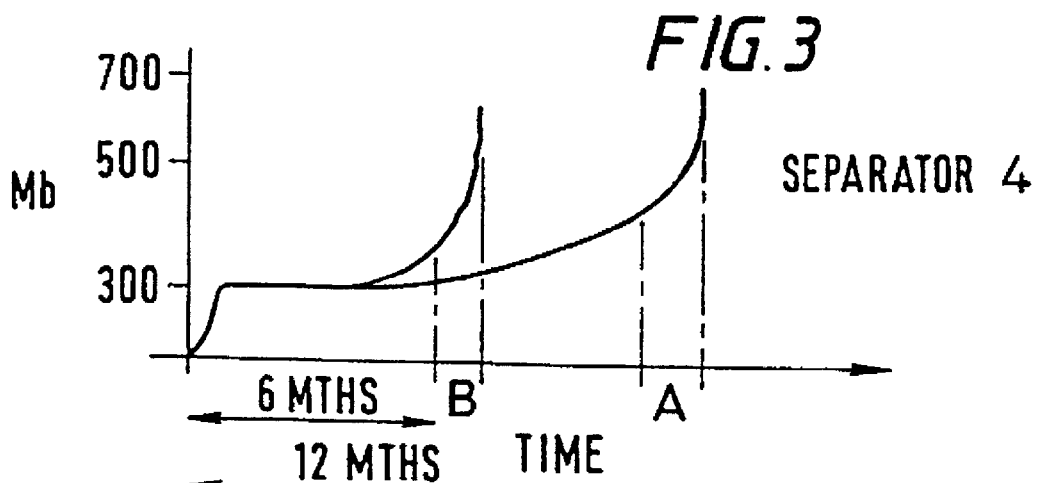
FIG. 3 is a graph showing for a coalescing filter forming part of the compressor of FIG. 1 pressure drop as a function of time.
Figure 4:
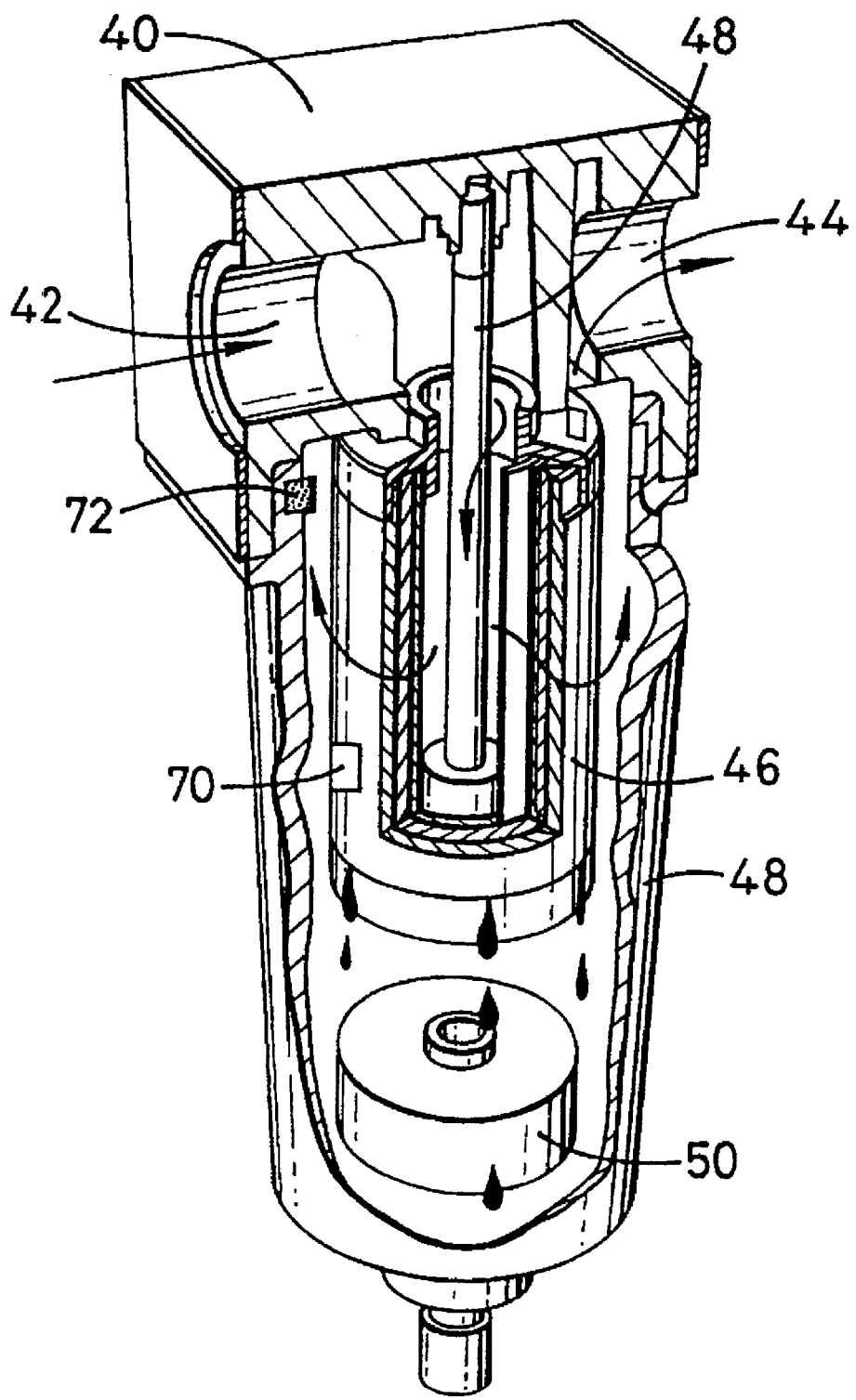
FIG. 4 is a diagrammatic view of an in-line coalescing filter unit.

Compressors powered by mains electricity or other sources of power are used to deliver streams of compressed gas for a variety of uses e.g., in building air conditioning systems, in spray painting, in small factories and vehicle repair installations, in compressed air systems for hospitals and laboratories and in the catering industry. The majority of compressors are oil-lubricated, the oil serving to lubricate the moving parts, removing heat and catching fine particles in the air being compressed. The major components of a typical compressor are illustrated in FIG. 1. Air from an intake 10 passes through intake filter 1 and thence via line 12 to a rotary vane or screw compressor unit 2 driven by electric motor 3. A mixture of compressed air, water and oil is expelled from the compression unit and travels via line 14 to an oil separation unit 16 shown diagrammatically in FIG. 2. Typically the stream of compressed air entering the unit 16 impinges onto a baffle 18 and the larger droplets coalesce and fall into a sump region 20. The air stream contains droplets of oil of size 0.3–1.5 $\mu$m, which are separated by means of a coalescing filter 4 of wrapped or molded glass micro-fibers so as to reduce contamination and recover the oil. Coalesced oil returns from the interior of the cartridge via a scavenging line 22 and line 12 to the compressor unit. The arrangement shown is for a vertical filter with droplets or may be in the form of vapor. The extent of purification required will depend on the use to which the compressed air is to be put, which can be e.g. to blow dirt away from workpieces etc., for pneumatic controls and instrumentation and air tools, building air conditioning, paint spraying and pharmaceutical and electronic applications. To remove trace contaminants, it is common to provide one or more in-line filters. FIG. 4 shows an in-line coalescing filter having a filter head 40 provided with an air inlet 42 and an air outlet 44. A replaceable filter cartridge 46 is supported from the head, 40 e.g. by means of a tie rod 48 and can be arranged for flow in an in-to-out direction as shown or in the reverse direction. Oil collects in a lower region of a filter bowl 48 and may be removed at intervals by means of a drain valve 40. Increasingly so-called "spun-on" filters are being used in which the filter and housing are supplied as a single disposable unit, which becomes threadedly attached to the filter head. For removal of vapor, an adsorbent cartridge filled with activated carbon replaces the coalescing filter 46. Oil coalescing filters and oil vapor removal cartridges are described, for example, in GB-A-1236396, 1557821, and 1609519, U.S. Pat. No. 3,841,484 and EP-B-0081297, the disclosures of which are incorporated herein by reference. Again the user may not service the in-line filter with manufacturer's original parts and may not adhere to specified service intervals.

Figure 5:
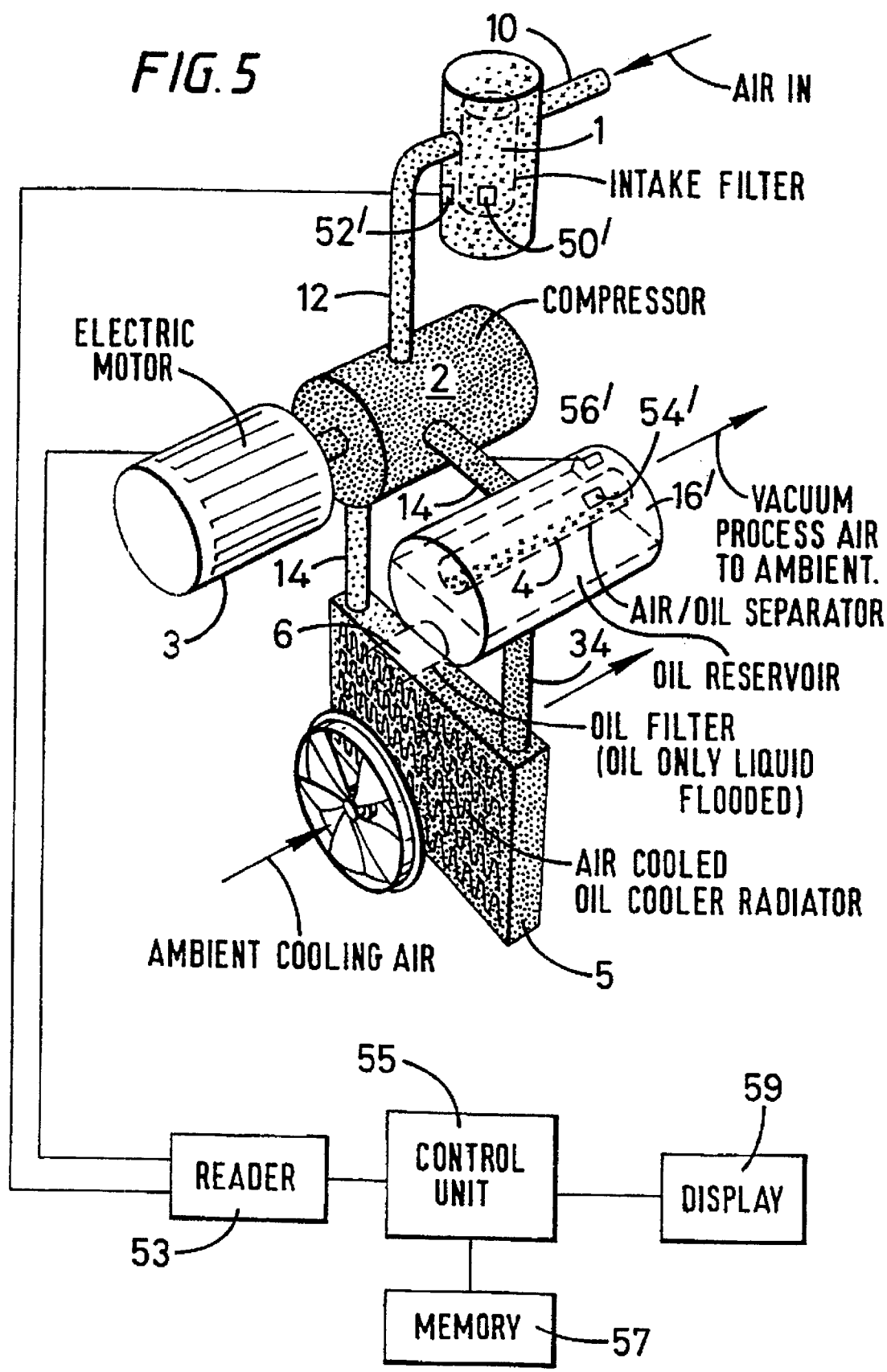
FIG. 5 is a diagram of a vacuum pump.
Figure 6:
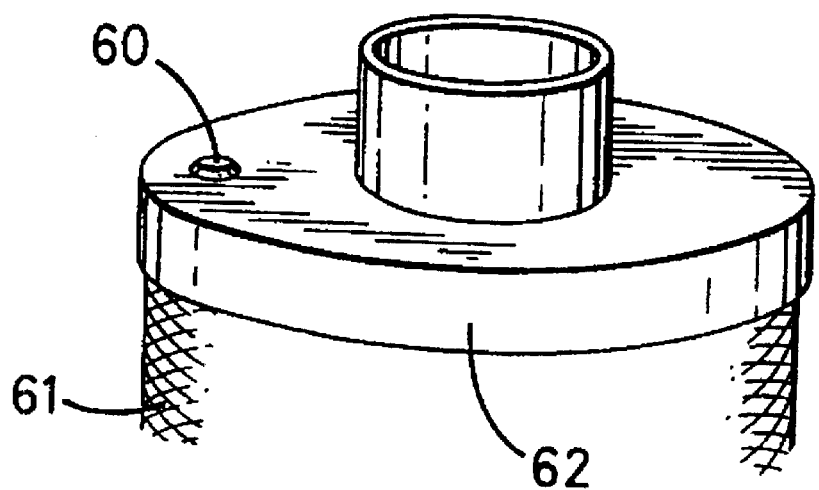
FIG. 6 is a detail of a filter showing an end cap.

An oil-lubricated rotary vane vacuum pump is diagrammatically shown in FIG. 5, in which reference numbers 50', 52', 54' and 56' have the same meaning as reference numbers 50, 52, 54, and 56, respectively, in FIG. 1. Again air from the space being evacuated enters the pump unit 2 via an intake filter 1. Oil circulates between the pump unit 2, a cooler radiator 5 and through filter 6 into reservoir chamber 16. Air passes from the chamber 16 and coalescing filter 4 to exhaust. Again, deficient intake and oil filters 1,6, or undue delay in their replacement can lead to premature wear or failure of the pump, and a deficient coalescing filter 4 can lead to contamination of the surroundings with oil.

The present invention aims to solve the above problem by providing replaceable filter elements in which there is concealed tamper-proof machine-readable identification. Such identification may be a single bit identification (i.e. the presence or absence of a record in memory or a device that will give a predetermined response to an interrogating signal) or it may be a multi-bit identification. A multi-bit identification may be used to provide a code, which may provide a family indication (e.g. manufacturer and model number) and a serial number, together with, if capacity permits, additional information such as date and place of manufacture and the like codes may be provided in a variety of forms. The stored information may be used to enable a check to be carried out that an approved filter is fitted. A change in serial number of the filter may be used to monitor compliance with approved times for filter exchange. In the case of a manufacturing defect, a stored serial number can also be used to trace the manufacturing details of the filter in question from the records held by the manufacturer and assist in tracing the cause of the defect.

Examples of non-contact identification technologies that may be applied to a filter to identify it with varying degrees of detail from mere type authentication to records of serial number etc. are set out below:

(a) A concealed strip of soft magnetic material in or on the filter which can be interrogated by a signal from a reader connected to an antenna in the filter head and having a frequency at which the strip is resonant. The resonance condition generates hysteresis or harmonics that are detectable to indicate that a filter is present and has the correct tag.

(b) A resonant circuit tag comprising an insulating substrate carrying a closed loop of a conductive element and a capacitive element which may conveniently be provided by two separate areas of thin metal on either side of the substrate. The tag may be attached to or built into the filter at a suitable location and may be interrogated by a RF signal at or near the resonant frequency of the circuit. An interrogating coil or antenna may be built into the filter head.

(c) A magnetostrictive tag attached to the filter. Such a tag can incorporate one or more strips of magnetostrictive material and a strip of magnetic material of high coercivity, the magnetostrictive material resonating mechanically in the presence of an a alternating magnetic field of the appropriate frequency. The interrogating magnetic field may be from a coil in the filter head that can be connected to a source of an appropriate AC frequency. A reader sensitive to a magnetic field of the appropriate frequency and also built into the filter head can detect resonance.

(d) A magnetically coupled transponder that operates at e.g. about 125 KHz is built into the filter. It may typically comprise a single integrated circuit attached to an antenna and have a read only memory, a power rectifying circuit, an oscillator and a driving circuit. Since the memory is permanent, power is not required to maintain the identity of the tag, which may be purely passive. Transponders of this type are available e.g. from Biomark of Boise, Id, USA and from Trovan.

(e) An electric field coupled transponder which may be a passive device operating at about 2.5 GHz and which may use backscatter modulation. The transponder may if desired adopt the Bluetooth specification for wireless connectivity and may form part of a piconet.

The filter may also be marked by a marker that requires an electrical contact for recovery of the stored information. For example, a ROM chip, e.g. a so-called "silicon serial number" DS 2401 is available from Dallas Semiconductor. Such a chip is less than 5 mm square and only 1.5 mm deep and can readily be fitted to or encapsulated within a filter. It requires connection to ground (which may be to an end cap or side wall of the filter) and has a single pin for control, address, data and power, so that only a single lead going to a single contact area on the filter is required.

Thus in FIG. 1, the intake filter 1 carries a transponder 50 that can be interrogated by a first antenna 52 connected to a reader 53 controlled by a control unit 55 which may be a device controlled by a microprocessor or microcontroller. The coalescing filter also carries a transponder 54 that can be interrogated.by a second antenna 56 in the unit 16 and also connected to the reader 53. The control unit also receives signals from devices that check the correct operation of the compressor, e.g. from an oil level sensor 58, an oil temperature sensor 60 and an exit air temperature 62. On change of a filter, or on re-start of the compressor after an interruption, the control unit 55 causes the reader 53 to supply interrogating signals to the antennae 52, 56. Returned data is checked to ascertain whether correct cartridges are in place. Assuming that both part identities and serial numbers are recorded in the memories of the transponders 50, 54 stored instructions in the control unit 55 cause this information to be recorded in memory 57. If one or other filter does not provide a correct response or any response, then the control unit causes an indication of this fact to be stored in memory. It may also cause a warning to appear at display 59 and/or it may cause inhibit further operation of the compressor. The control unit 55 may be part of a service/diagnostic system for the compressor or vacuum pump, and if the presence of correct filters is not detected, it may simply log in memory 57 the main system for a factory, hospital or other place where compressed air is used as a source of energy. It is also useful for underground interception filters for installations made by Conder and other manufacturers to condition outflow water from interceptor tanks of industrial installations (e.g. petroleum retail forecourts) or waste water prior to discharge into a coarse sewer or water-way.

Figure 7:
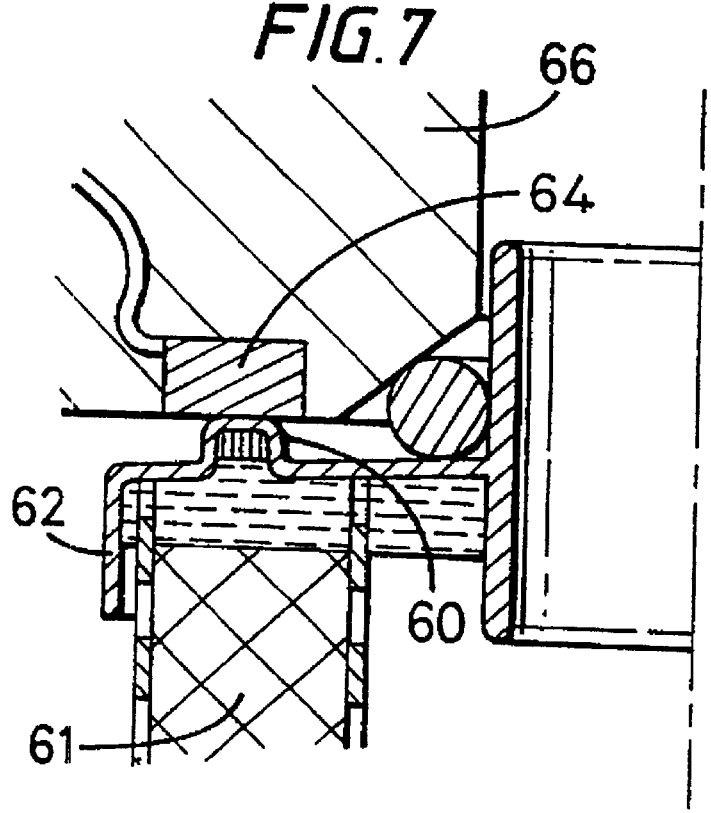
FIG. 7 is a detail in vertical section of the filter to one side of the end cap showing adjacent portions of the filter housing.
Figure 8:
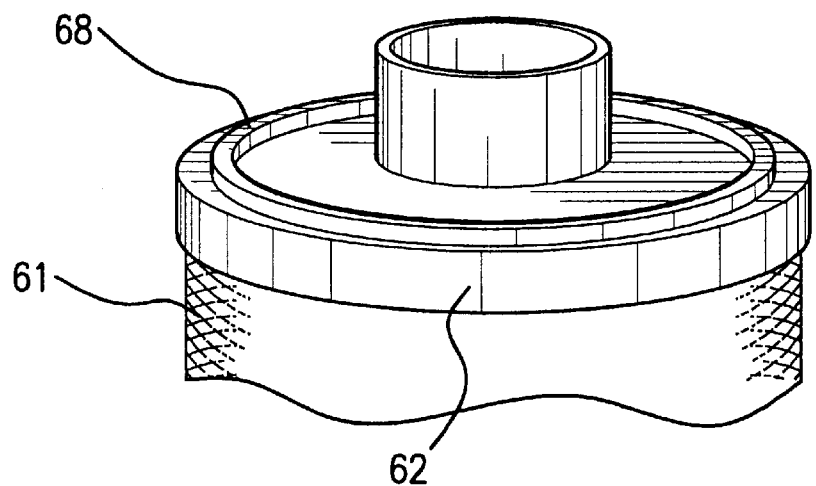
FIG. 8 shows another form of end cap provided in a filter according to the invention.

In the case of oil coalescing filters, the filter medium usually takes the form of a tube 61 of pleated, wrapped or molded glass microfibre which is closed by metal or plastics end caps at each end. The identification device may be concealed within one or other of the end caps, and preferably within the end cap intended to fit within a filter head attached in-line or to a compressor, vacuum pump or other active device. Thus one of the end caps may have a memory chip on or buried within it, the chip having an identity code recorded in memory and a connection to a metal component of the filter (which will normally be connected to earth) and a data lead. As shown in FIG. 7 such a data lead may go to a contact nib 60 projecting from end cap 62 which when the filter is correctly positioned mates with a contact 64 in an adjoining portion 66 of the filter head. In FIG. 8 a contact ring 68 replaces the nib 60 so that a connection is made with the terminal 54 of the filter head irrespective of the angular position of the filter. Interrogation signals can then be transmitted directly from the filter head to a silicon serial number or other memory device fitted on or in the filter, and stored identity information can be recovered therefrom. A control unit can therefore check whether an approved filter is being used and by checking its internal clock whether correct filter exchange times are being obeyed.

Means may be provided to measure the pressure drop across the coalescing and/or intake filters and may be arranged to generate a signal when the pressure drop has reached a predetermined value signifying that the filter element has reached the end of its useful life. If the time required is less than the manufacturer's service interval, the internal records of the compressor, vacuum pump or other active device may show that this is because an authentic replacement filter was not fitted.

The invention is applicable to other forms of fluid filter e.g. oil filters for internal combustion engines. In particular it can be used for air intake filters for internal combustion engines and compressed air systems used throughout the transport industry including aircraft, trains, ships, automobiles and goods vehicles. It is applicable to compressors used to provide a supply of compressed air for a ring-main system for a factory, hospital or other place where compressed air is used as a source of energy. It is also useful for underground interception filters for installations made by Conder and other manufacturers to condition outflow water from interceptor tanks of industrial installations (e.g. petroleum retail forecourts) or waste water prior to discharge into a coarse sewer or water-way.

Figure 9:
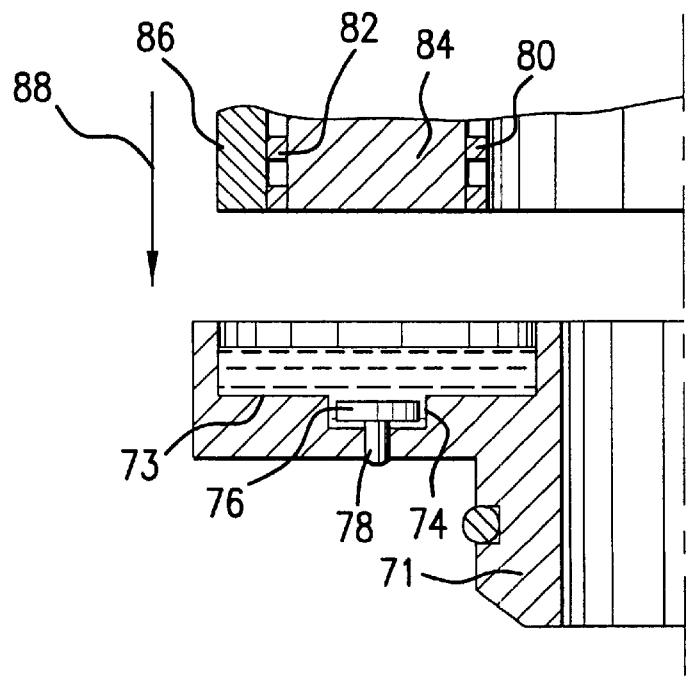
FIG. 9 shows part of a filter cartridge diagrammatically in section during the course of manufacture.

In FIG. 9 there is shown part of a filter having a plastics end cap 71 formed with an annular flanged and upturned region defining a resin well 73 which is formed with a recess 74 for receiving a memory chip 76 which could be a Dallas Silicon Serial Number or the like. One side of the chip is grounded by connection (not shown) to metallic parts of the filter cartridge and its data pin is connected to a terminal 78 that appears through the exposed face of the end cap. The filter has inner and outer sleeves 80, 82 of expanded metal between which is sandwiched a mounded glass fibre coalescing filter 84. On the outer face of the sleeve 82 there is provided a drainage layer of non-woven material. The above components are pushed into a layer of polyurethane adhesive in the well 72, and the adhesive is allowed to cure to complete the end of the filter, the chip 76 being held in a well-protected location. It will be appreciated that the above position is only one possibility and other locations for a chip or a transponder are possible e.g. between the coalescing filter 84 and the drainage layer 86. Magnetic or magnetostrictive elements may simply be adhered to the exterior of the end cap, though it is preferred that they should be concealed.

It will be appreciated that the above embodiments are described by way of example only, and that modifications may be made thereto without departing from the invention.

What is claimed is:

1. A compressor or vacuum pump including:

an air intake or coalescing filter for conditioning the flow of gas to maintain the correct functioning of the compressor or pump and which requires to be replaced periodically;

means applied to said filter for providing concealed tamper-proof machine-readable identification for said filter;

a filter head or housing forming part of said compressor or vacuum pump and having means for detecting said identification;

means for measuring the pressure drop across the air intake or coalescing filter and for generating a signal when the pressure drop has reached a predetermined value signifying that the filter has reached the end of its useful life; and control means operable to interrogate a new cartridge whenever the filter is changed to recover the identification, store in memory whether an authentic replacement filter has been fitted and provide an indication whether a useful life less than a service interval recommended by the manufacturer is associated with non-use of an authentic replacement filter.

2. The compressor or vacuum pump of claim 1, wherein the identification comprises a part identity for said filter.

3. The compressor or vacuum pump of claim 1, wherein the identification includes a serial number traceable to the manufacturing details of said filter.

* * * * *